Dec. 23, 1952   L. S. WILLIAMS   2,622,867
WEIGHING SCALE
Filed Aug. 5, 1949   6 Sheets-Sheet 1
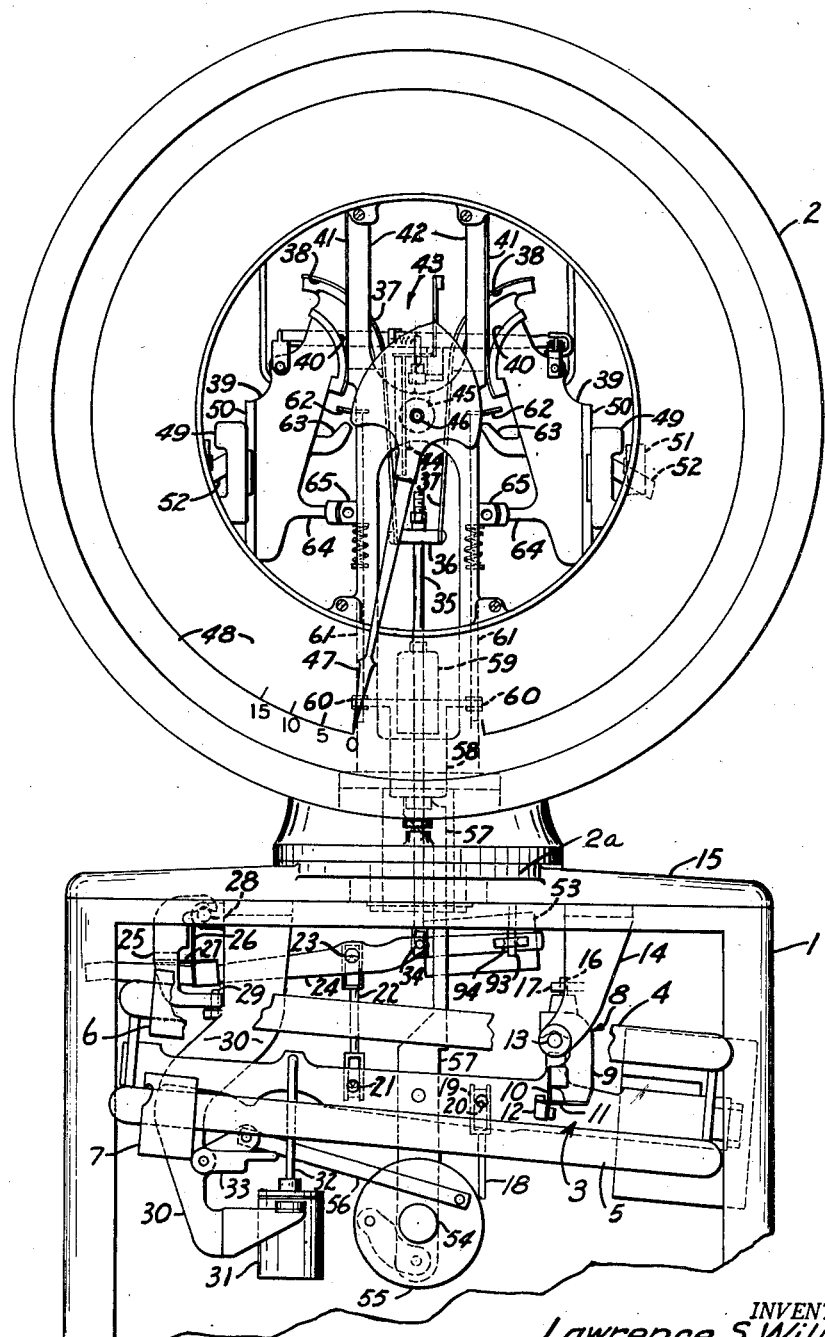
Fig. I
INVENTOR.
Lawrence S. Williams
BY
Marshall, Marshall & Leonard
ATTORNEYS

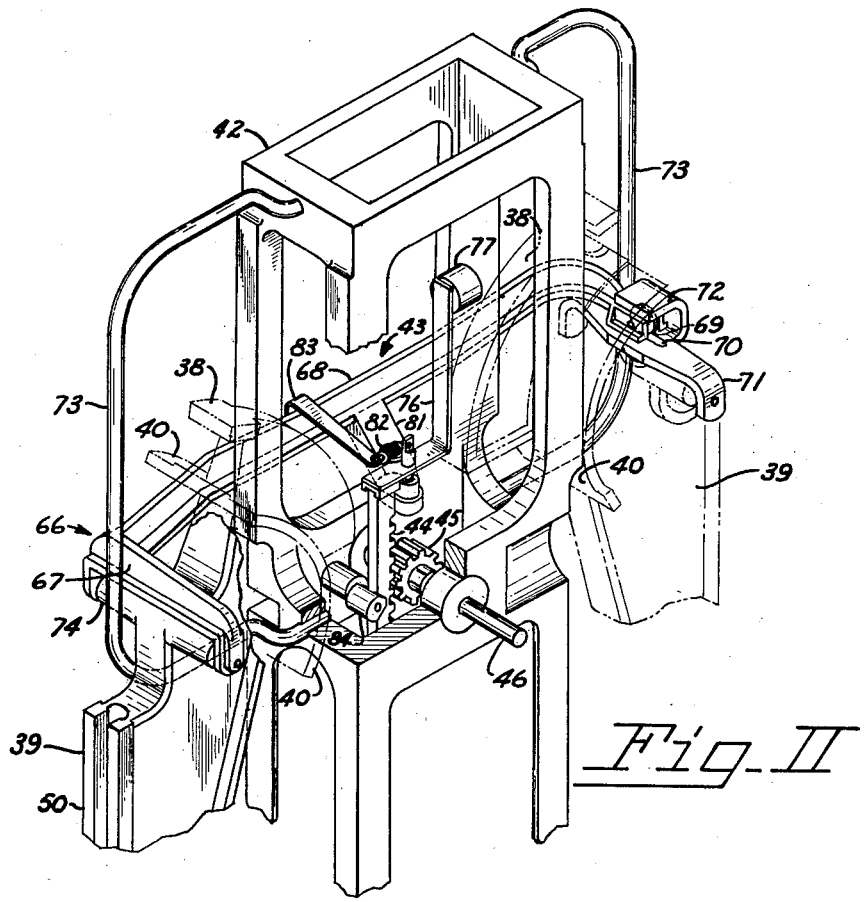

Dec. 23, 1952 L. S. WILLIAMS 2,622,867
WEIGHING SCALE
Filed Aug. 5, 1949 6 Sheets-Sheet 3
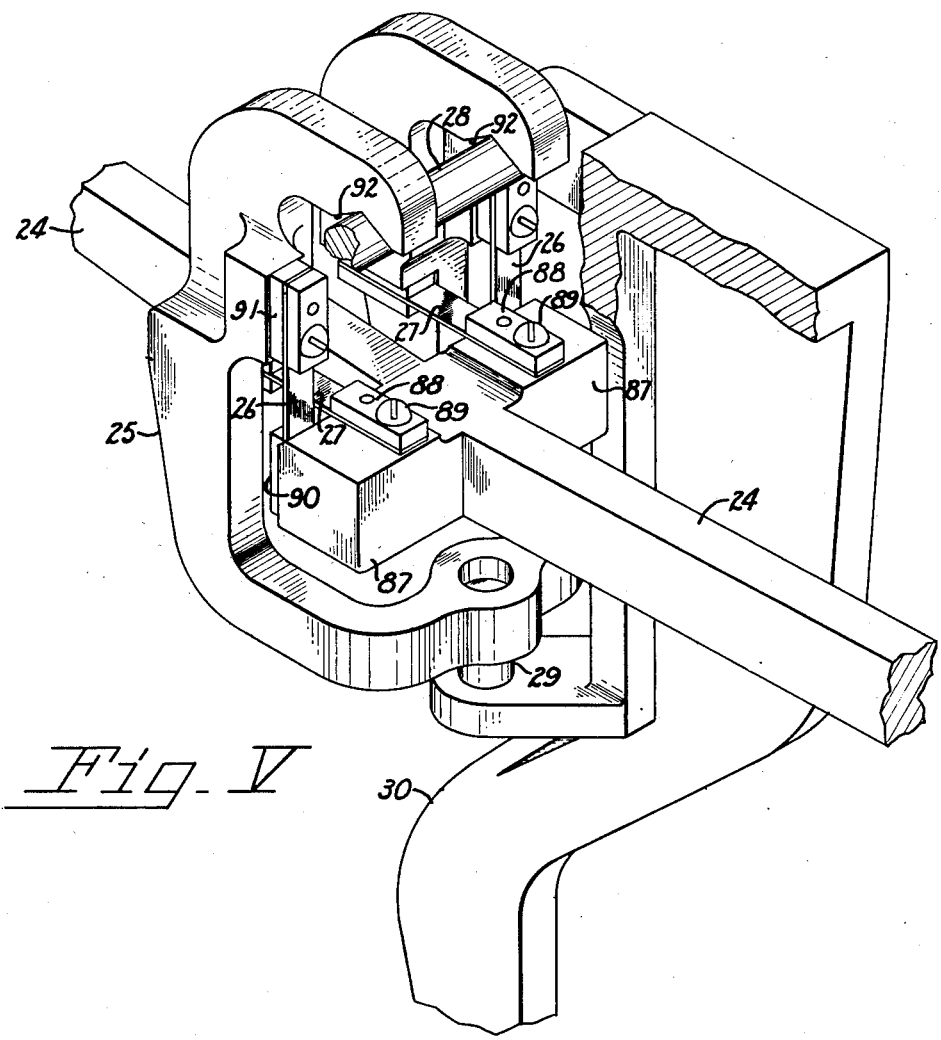
Fig. V
INVENTOR.
Lawrence S. Williams
BY
Marshall, Marshall & Leonard
ATTORNEYS Dec. 23, 1952 L. S. WILLIAMS 2,622,867
WEIGHING SCALE
Filed Aug. 5, 1949 6 Sheets-Sheet 4
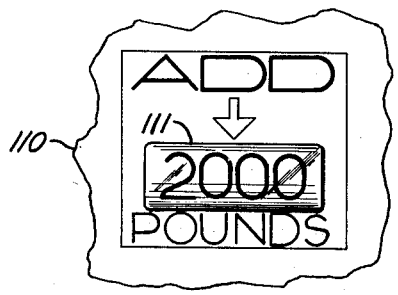
Fig. VIII
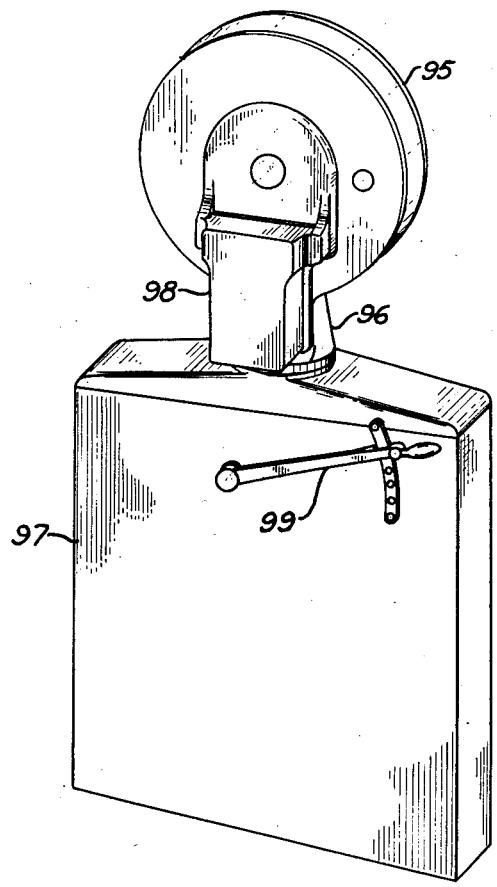
Fig. VI
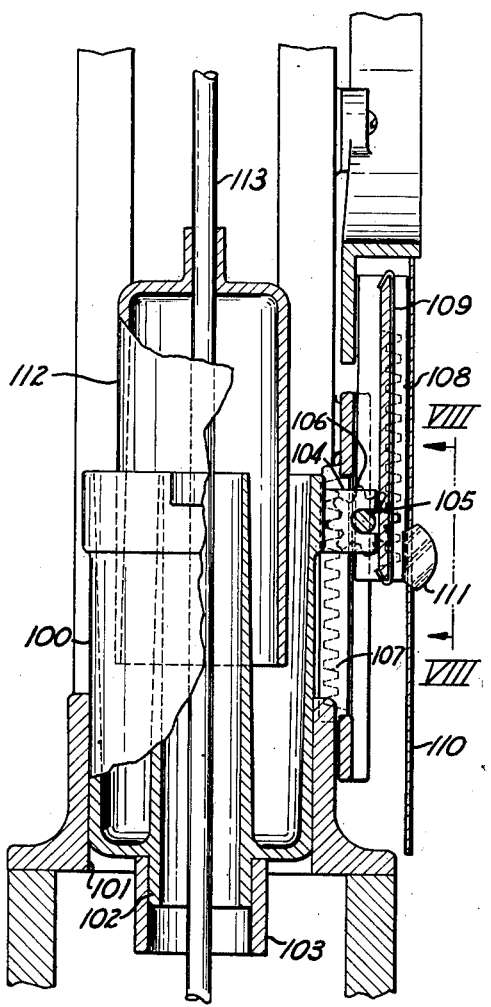
Fig. VII
INVENTOR.
Lawrence S. Williams
BY
Marshall, Marshall & Leonard
ATTORNEYS Dec. 23, 1952 L. S. WILLIAMS 2,622,867
WEIGHING SCALE
Filed Aug. 5, 1949 6 Sheets-Sheet 5
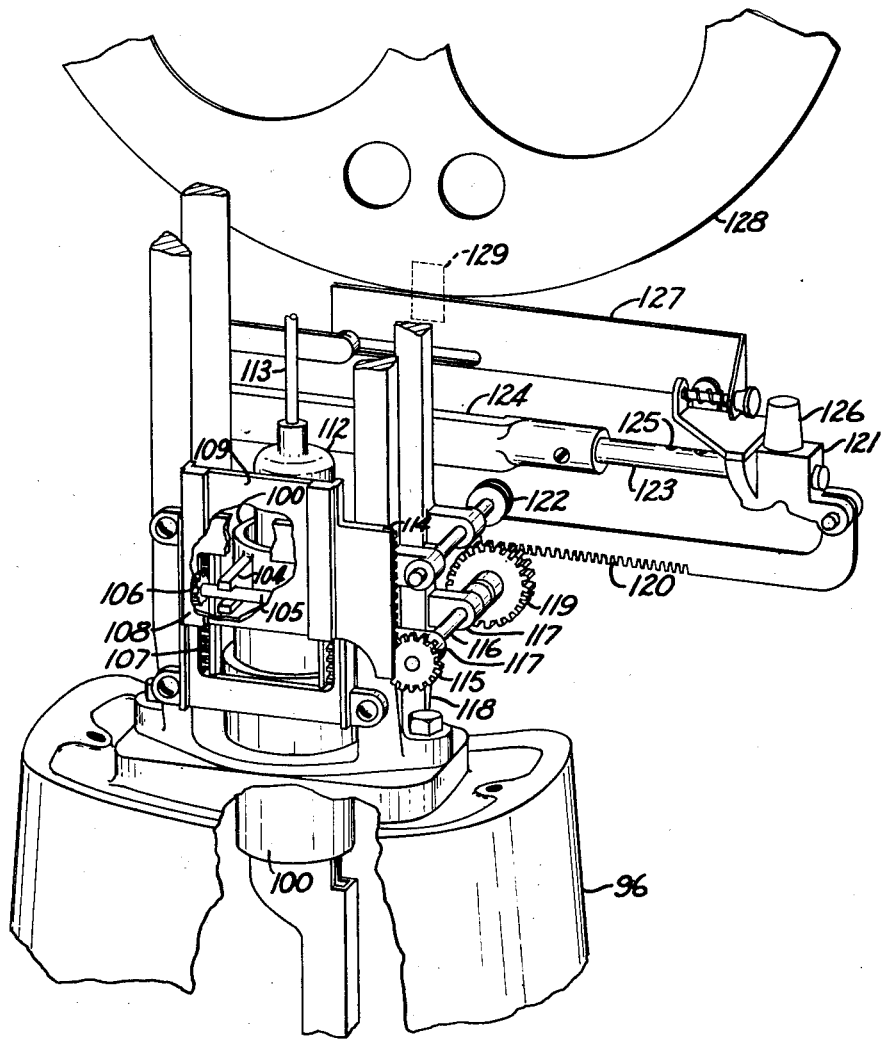
Fig. IX
INVENTOR.
Lawrence S. Williams
BY
Marshall, Marshall & Leonard
ATTORNEYS

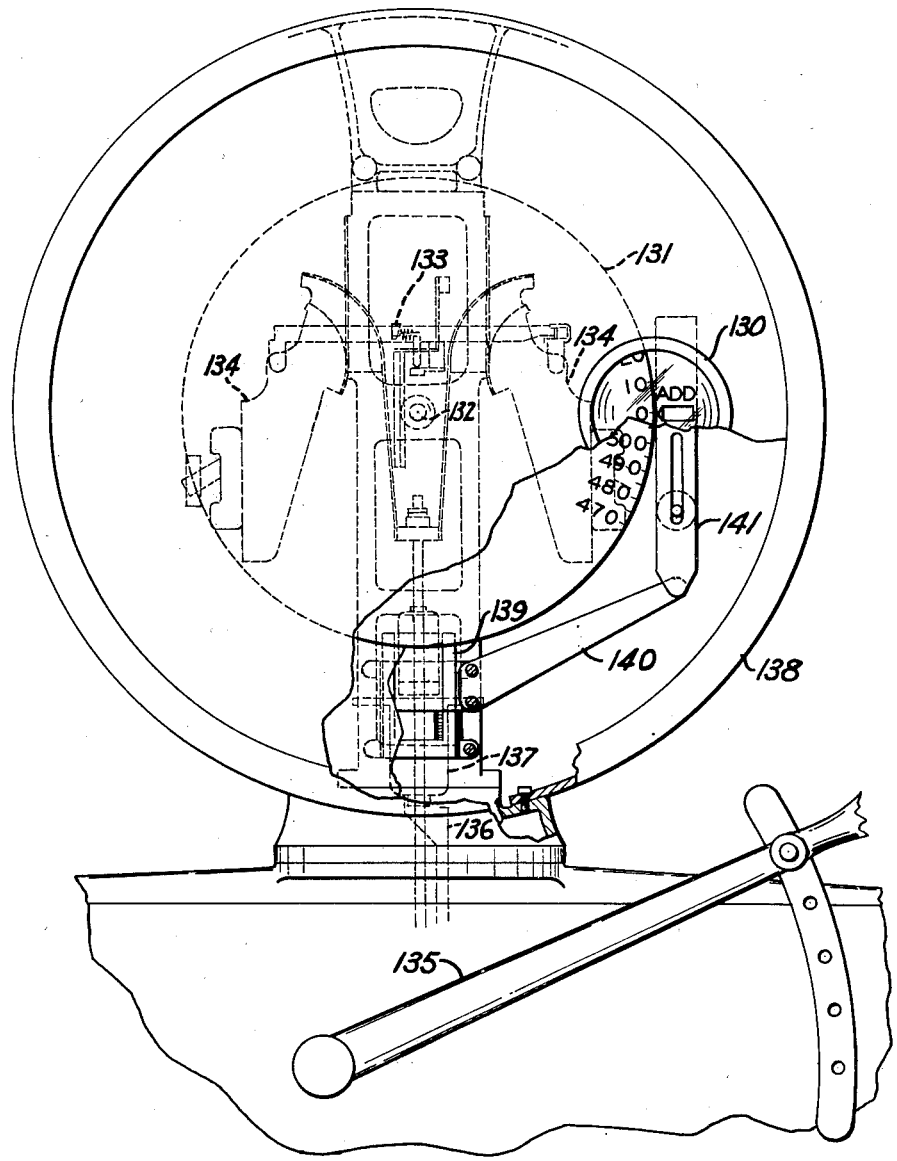
Fig. X
INVENTOR.
Lawrence S. Williams

Patented Dec. 23, 1952

2,622,867

UNITED STATES PATENT OFFICE 2,622,867

WEIGHING SCALE

Lawrence S. Williams, Toledo, Ohio, assignor to Toledo Scale Company, Toledo, Ohio, a corporation of New Jersey Application August 5, 1949, Serial No. 108,795

7 Claims. (Cl. 265—27)

This invention relates to weighing scales and in particular to improvements in the mechanism for driving the indicating portions of the weighing scale mechanism.

Automatic load counterbalancing mechanism employing pendulums have enjoyed extensive commercial use. While the pendulums themselves are highly accurate and sensitive they are nevertheless unable to apply any driving force to an indicating mechanism when they are in exact balance with the load being weighed. As a result of this limitation the indication of any pendulum weighing scale is in error by an amount depending upon the force required to move the automatic indicating mechanism. Therefore, one of the objects of any designer of automatic scales is to reduce frictional drag of the indicating mechanism to a minimum. To reduce the friction from accumulated dust and eliminate wear and other factors adverse to continued accuracy many weighing scales incorporate locking mechanism as well as auxiliary indicating mechanism within the dial housing of the scale and include a liquid seal to exclude dust and moisture from the interior of the dial housing. It is furthermore desirable that the dial housing be rotatable about a vertical axis so that the scale dial may be faced in any desired direction. Weighing scales, as previously constructed have provided all of these desirable features individually but no scale provided all the features simultaneously since by known construction certain of the features excluded others.

The principal object of this invention is to provide a weighing scale structure having extremely low indicator friction.

Another object is to provide a weighing scale structure in which auxiliary indications or functions may be easily provided in a liquid-sealed rotatable dial housing.

A still further object of the invention is to provide an improved indicator drive mechanism in which each part is constructed and assembled in an arrangement that eliminates back lash between connected parts and that evenly distributes transmitted forces to avoid any random deflections or uncertainty of positioning of any of the elements of the mechanism.

A more specific object of the invention is to provide greatly enhanced apparent movement of an auxiliary indicating mechanism whereby a large plurality of large easily recognized indicia are selectively presented by a relatively short travel of an auxiliary drive mechanism.

A still further object of the invention is to provide a drive mechanism for auxiliary indicating structure which drive mechanism is readily adaptable to various types of indication.

More specific objects and advantages are apparent from the following description of a weighing scale embodying the invention.

According to the invention a liquid seal that seals a rotatable dial housing enclosing a load counterbalancing mechanism is made movable with respect to the dial housing and the movement of the normally stationary part of the liquid seal container is employed to perform auxiliary functions within the dial housing. The invention further employs a differential rack and pinion for enhancing the movement of an auxiliary indicating chart with respect to the movement of the auxiliary drive mechanism as well as improvements for reducing the friction in the mechanism.

The invention is readily apparent from the following specific description of a preferred embodiment of the invention illustrated in the accompanying drawings.

In the drawings:

Figure I is a front elevation with parts broken away and other parts in outline showing the cooperation and structure of various parts of the weighing scale mechanism.

Figure II is a fragmentary perspective view showing the improved drive mechanism for rotating an indicator shaft according to the rotation of load counterbalancing pendulums.

Figure III is a detailed sectional view showing one end of the indicator drive mechanism illustrated in Figure II.

Figure IV is a fragmentary detail showing the support for a rack that cooperates with a pinion to drive the indicator shaft.

Figure V is a perspective view of an improved lever supporting structure for the improved weighing scale.

Figure VI is a perspective view of another type of scale embodying the invention.

Figure VII is a vertical section showing an auxiliary indicating mechanism of the scale illustrated in Figure VI driven by the movable liquid seal container.

Figure VIII illustrates the appearance of the auxiliary indicator as seen from the line VIII—VIII of Figure VII.

Figure IX is a perspective view showing the auxiliary indicator driving mechanism of the scale illustrated in Figure VI as arranged to position a type bar so that loads counterbalanced by the auxiliary weights may be automatically recorded by a printing mechanism.

Figure X is a front elevation of a heavy capacity dial scale employing magnified indicia of the loads counterbalanced by automatic pendulums and load counterbalanced by auxiliary weights applied to the lever system.

These specific figures and the accompanying description are intended merely to illustrate the invention but not to impose limitations on its scope.

A weighing scale embodying the invention includes a frame in the form of a column 1 surmounted by a dial housing 2 erected on a housing base or collar 2a. The weighing mechanism within the column 1 includes a first lever 3 that carries a tare beam 4 and a capacity beam 5. A poise 6 on the tare beam 4 may be used to offset tare loads applied to the load receiver of the weighing scale while a poise 7 carried on the capacity beam 5 may be used to augment the load counterbalancing capacity of the mechanism within the dial housing 2.

The first lever 3 is pivotally supported on a flexure plate fulcrum assembly 8 that comprises a generally C-shaped frame 9, vertical supporting ribbons 10 and horizontal checking ribbons 11. The ribbons 10 and 11 are attached to vertical and horizontal surfaces respectively of laterally extending lugs 12 of the first lever 3. The C-shaped frame 9 is hooked over a support rod 13 transversely mounted in the lower end of a downwardly depending bracket 14 secured to a shelf 15 forming the top of the column 1. The C-shaped frame 9 is held against swinging motion by an upwardly extending pin 16 that engages a hole in a lug 17 extending laterally from the downwardly depending bracket 14. The line of action of the forces transmitted through the ribbon 10 is offset from a vertical plane through the support rod 13 so that the fulcrum assembly 8 is urged in a direction that maintains the pin 16 firmly engaged against a side of the hole through the lug 17. Lateral forces applied to the lever 3 of magnitude sufficient to damage the check ribbon 11 cause the fulcrum assembly 8 to move with respect to the support rod 13 this movement being permitted by the shape of the notches in the C-shaped frame 9 that engages the rod.

Load forces to be counterbalanced are transmitted from a load receiver supporting lever system through a steelyard rod 18 suspended from a stirrup and bearing assembly 19 resting on a load pivot 20 of the first lever 3. From the lever 3 the load forces are transmitted through a power pivot 21 and connecting linkage 22 to a load pivot 23 of a second lever 24. The second lever 24 is carried on a flexure plate fulcrum frame 25 that includes supporting ribbons 26 and check ribbons 27. The fulcrum frame 25 is also C-shaped in form and is suspended from a support rod 28 and guided by a pin 29, the support rod and pin being mounted in a downwardly directed bracket 30 attached to the underside of the shelf 15 at the top of the column 1. The downwardly directed bracket 30 at its lowermost end supports a dashpot 31 a stem 32 of which is pivotally connected to the first lever 3. This bracket 30 also carries a locking finger 33 that may be engaged with the lower surface of the first lever 3 to relieve the weighing mechanism of the forces of the loads on the load receiver.

The second lever 24 has a power pivot 34 engaging a bearing at the lower end of a steelyard rod 35 that extends upwardly into the dial housing 2 and is suspended from a cross head 36. The cross head 36 is in turn supported by power ribbons 37 that overlie and are attached to the upper ends of power sectors 38 of a pair of floating pendulum bodies 39. The pendulum bodies 39 also include fulcrum sectors 40 to which pendulum supporting ribbons 41 are attached. The pendulum supporting or fulcrum ribbons 41 extend upwardly along the sides of and are attached to the upper ends of an upper frame which is in the form of a sector guide 42 that is mounted vertically within the dial housing 2.

A rack drive assembly 43 is supported from the pendulum bodies 39 at the centers of the fulcrum sectors 40. This assembly carries a rack 44 that cooperates with a pinion 45 mounted on an indicator shaft 46 to drive an indicator 47 according to the movement of the pendulum bodies 39. The indicator 47 cooperates with indicia on a chart 48 to indicate the magnitude of the load counterbalanced by the pendulums.

The load counterbalancing capacity of the pendulums is adjusted by means of major weights 49 that are adjustably mounted on tracks 50 of the pendulum bodies 39. The weights 49 also include minor weights 51 that are mounted on downwardly inclined tracks 52 of the major weights 49.

The power sectors 38 are circular arcs that are eccentric with respect to the centers of the fulcrum sectors 40. The eccentricity of these sectors and the location of the track 50 is selected so that movement of the weights 49 along the tracks 50 changes the full capacity load counterbalancing effect of the pendulums twice as much as the change at half capacity. This permits the capacity of the pendulums to be changed without introducing a non-linear relation between indicator travel and load, i. e., the capacity adjustment is pure in that it does not introduce other errors into the scale.

The minor weights 51 are adjusted to secure correct half capacity indication. The slope of the minor weight tracks 52 is selected so that adjustment of the minor weights 51 does not change the net load counterbalancing capacity of the pendulum. In other words, movement of the minor weights changes the initial pull and full load pull in equal amounts while increasing or decreasing the pull at the half capacity position in slightly greater amounts. Thus, after a re-balancing of the scale at zero following an adjustment of the minor weights 51 the scale will be found to have the same capacity but a slightly different half capacity indication.

A weight 53 slidably mounted on the second lever 24 is adjusted along the lever to secure correct initial pull or zero reading of the indicating mechanism.

When this column and dial mechanism is employed in a portable scale the column 1 is provided with a transverse horizontal shaft 54 carrying a cam plate 55 within the column 1 and a handle (not shown) outside the column. The cam plate 55 drives a pivotally connected bar 56 to actuate the lever locking finger 33 during the initial portion of its locking movement. The cam plate 55 also, through a roller, drives an upwardly extending locking bar 57 the upper end of which is rotatably connected to the bottom end of an annular cup 58 constituting the container portion of a liquid seal. A downwardly opening cup 59 threaded on the steelyard rod 35 and dipping into the annular cup 58 completes the oil seal. The container portion 58 is a sliding fit in the housing base or collar 2a supporting the sector guide 42 and includes laterally extending ears 60 in which vertical rods 61 are secured. The upper ends of the rods 61, which are guided in the sector guide 42, have perforated plates 62 which, when they move downwardly, engage upwardly directed locking horns 63 of the pendulum bodies 39 thereby drawing the pendulum bodies 39 against the sector guide 42 until bumpers 64 engage bumper brackets 65. Thus rotation of the locking device shaft 54 in the column 1 both drives the first lever 3 to its uppermost position allowing the pendulums to drop past their zero load positions and then drops the perforated locking plates 62 to engage the horns 63 to complete the locking of the entire load counterbalancing mechanism.

Referring now to Figure II the rack drive assembly 43 includes a first frame 66 having a yoke portion 67 pivotally mounted on the turning axis of one of the pendulum bodies 39. This frame 66 also includes an arm 68 that extends past the sector guide 42 and then is turned to partially embrace the other of the pendulum bodies 39. The end of the arm 68 is bifurcated to receive a small wheel or roller 69 (see also Figure III) that runs in a groove 70 cut in a second yoke shaped frame 71 that is pivotally mounted on the turning axis of the other of the pendulum bodies 39. An overhanging lip 72 of the second frame 71 prevents the wheel 69 from leaving the groove 70.

The connection between the wheel 69 and the pivoted yoke 71 cannot prevent separation or spreading of the pendulum bodies 39 as the scale is tipped or subjected to vibratory force. Therefore a pair of guard rods 73 are provided, such rods being attached to the sector guide 42 and positioned closely adjacent axle-like portions 74 of the pendulum bodies 39. In normal operation there is no contact between the axle-like portions 74 and the guard rods 73. However, the clearance between these members is small enough to prevent any derangement of either the pendulums 39 or the rack drive assembly 43.

Referring to Figure III the yoke 71 is supported from the pendulum body 39 by means of sharp cone-pointed screws 75 that engage center drilled holes in the ends of the axle-like portions 74. Friction is reduced to a minimum by making the taper of the holes slightly greater than the taper of the screws so that the only rubbing contact is on a very small area near the tip of each screw. The yoke 67 of the first frame 66 is similarly supported on the other pendulum body 39.

The connection between the rack drive assembly 43 including the first frame 66 and rack 44 is also designed to reduce frictional effects to a minimum. As shown in Figures II and IV the rack 44 is attached at its upper end to an L-shaped bracket 76 that includes a horizontal portion and a vertical portion extending upwardly and carrying a counterweight 77. A downwardly directed cone pointed pivot 78 mounted in the horizontal leg of the rack supporting bracket 76 engages a conical recess 79 in a bearing 80 that is mounted in the end of a laterally directed finger 81 of the arm 68 of the first frame 66. The counterweight 77 is adjusted in mass and position so that the composite center of gravity of the rack 44, bracket 76 and counterweight 77 is located at the tip of the cone pointed pivot 78. This assembly is thus in neutral equilibrium and there is, therefore, no gravity force acting to hold the rack in mesh with the pinion 45. In this assembly the rack meshing pressure is provided by a spring 82 that is held under light tension between the upper end of the cone pointed pivot 78 and a thin arm 83 adjustably secured to the first frame arm 68. The point of contact between the spring 82 and the upper end of the pivot member 78 is substantially in vertical alignment with the cone pointed tip of the pivot so that the spring provides rack meshing pressure without otherwise contributing to the alignment of the rack or its angular position about a vertical axis.

Since the rack has appreciable width—the length of each tooth—it is desirable that the engagement between the teeth of the rack and the teeth of the pinion determine the alignment of the rack. In this construction, employing a cone pointed pivot, the rack is free to rotate about any of three axes. Rotation of the rack about a horizontal axis lying in the plane of movement of the pendulum bodies and rotation of the rack about a vertical axis allow the rack to position itself so that its teeth are precisely parallel with the teeth of the pinion. Rotation of the rack about an axis perpendicular to the plane of movement of the pendulums determines the depth of engagement of the rack teeth with the pinion teeth and this rotation, urged by the spring 82, is limited by the full engagement of the rack teeth with the pinion teeth. This construction permitting the rack to align itself in all directions eliminates the greater portion of the friction force ordinarily encountered between the rack and the pinion teeth. It eliminates all tendency for the teeth to bind.

Complete disengagement of the rack from the pinion is prevented by a slotted backstop 84 that is adjusted in position to loosely embrace the back of the rack 44 and prevent it from straying from the position determined by the engagement of the teeth. The balancing of the rack assembly and the provision of rack meshing pressure by means of the spring 82 make the rack meshing pressure independent of the condition of level of the scale.

The cone-pointed pivot 78 is held in operative engagement with the bearing 80 by means of a washer 85 riveted on the upper end of a screw 86 that is threaded through the lower end of the finger 81 with the washer located just above the horizontal portion of the L-shaped rack bracket 76. A spring 87 mounted on the lower end of the screw 86 holds it in adjusted position. One side of the washer 85 is cut away so that when it is desired to remove the rack it is only necessary to give the screw 86 a half-turn thus opening the way for the rack assembly to be lifted up and away from the finger 81.

Referring now to Figure V the fulcrum supports for the levers 3 and 24 each include flexure plates in lieu of the knife edges and bearings. The construction of one of these fulcrums is shown in perspective in Figure V. While this view shows the fulcrum pivot for the lever 24 the fulcrum for the other lever is constructed according to similar principles. As shown in Figure V the lever 24 has laterally extending lugs 87 the upper surfaces of which are machined to receive the horizontal flexure ribbons 27. These ribbons are doweled to the lugs 87 as well as being clamped beneath clamp plates 88 held in place by screws 89. The other ends of the horizontal check ribbons 27 are similarly clamped to the underside of machined surfaces formed in the C-shaped frame 25. Likewise the vertical supporting ribbons 26 are secured under clamps 90 fastened to vertical surfaces of the lugs 87 and to similar clamps 91 attached to vertical surfaces of the C-shaped frame 25. The corners of the lugs 87 between the horizontal and vertical surfaces are beveled, the cut taking approximately $\frac{1}{16}$ of an inch from each surface. The purpose of this bevel is to provide the short unsupported lengths of the flexure ribbons between their points of support or clamping to the lugs 87 and their points of intersection. This beveling is necessary in order to minimize the displacement of the effective turning center of the lever as the lever is oscillated in normal weighing operations. The amount of the bevel required varies according to the length and stiffness of the flexure ribbons and is selected so that there is virtually no lateral or vertical translation of the axis defined by the intersection of the surfaces of the lug 87 to which the ribbons are attached.

Since it is possible to damage the flexure ribbons by overloading them in compression until they buckle, the C-shaped frame 25 is constructed so that it will yield before excessive overloading of the ribbons occurs. As shown in Figure V the bifurcated upper end of the C-shaped frame has shallow notches 92 that engage the support rod 28. Likewise the frame 25 is held against swinging movement by loose engagement with the stabilizing pin 29. In the presence of excessive force in a direction tending to buckle the ribbons 26 or 27 the C-shaped frame merely slides on the support rod 28 and the lever 24 engages fixed stops such as a pin 93 cooperating with a hole 94 as shown in Figure I. As there shown, the pin is a loose fit through a hole in the lever 24 and thus serves to prevent excessive movement without interfering with the movement of normal weighing.

In order that the looseness between the stabilizing pin 29 and the C-shaped bracket 25 shall not introduce errors into the weighing the notches 92 and support rod 28 are offset from the vertical plane through the ribbons 26 thus causing the load forces to always exert a moment tending to rotate the C-shaped frame 25 in the same direction and thus always take up the clearance between the pin 29 and the frame 25. The offset is sufficient so that the moment produced thereby always exceeds the bending moment produced in the ribbons by the normal oscillation of the lever.

The advantages of the slidable liquid seal container may also be extended to stationary or built in scales of the cabinet type such as the scale indicated in Figure VI. This scale comprises a generally circular housing 95 surmounting a column 96 erected from the top of a frame which in this embodiment is in the form of cabinet 97. This scale is shown as being equipped with a printing mechanism that is contained within a housing 98 attached to the circular housing 95. In this type of scale loads to be weighed are counterbalanced in part by a pendulum mechanism mounted within the circular housing 95 and in part by weights that are deposited on the lever system by operation of a weight controlling arm 99. In any fixedly mounted scale for convenience in reading it is desirable that the dial mechanism including the housing 95 and column 96 be rotatable with respect to the cabinet 97. It is also imperative that the amount of load being offset or counterbalanced by the weights applied to the lever system within the cabinet 97 be indicated at the printing mechanism within the housing 95. According to the invention this is accomplished, without sacrifice of the liquid sealing considered desirable as a protection against dirt, by moving the normally stationary part of the oil seal up and down according to the addition or removal of counterbalancing weights and employing that movement of the seal to actuate indicating mechanism within the housing 95.

A simple form of indication is illustrated in Figures VII and VIII. In these figures an annular cup 100 forming part of an oil seal is slidable in a vertical bore 101 in the upper end of the column 96 of the housing 95. The bottom end of the annular cup 100 has a downwardly directed tenon 102 that is engaged in the upper end of an operating member 103 connected to the weight applying mechanism controlled by the handle 99. Thus the annular cup 100 is moved up and down to a position that corresponds to the number of weights applied to the lever system.

The upper end of the annular cup 100, see also Figure IX, has a pair of forwardly directed bifurcated ears 104 that journal a short cross shaft 105. A pair of pinions 106 fixedly mounted on the cross shaft 105 engage stationary racks 107 and movable racks 108. The movable racks 108 are part of a movable chart 109 upon which indicia corresponding to the unit weights are suitably printed. The chart 109 slides behind a screen 110 that also serves as a track to hold the racks 108 in mesh with the pinions 106. The indicia are viewed through a cylindrical lens 111, Figure VIII showing the indication as actually presented to an observer.

The travel of the chart 109 is twice as great as the travel of the annular cup 100 because of the multiplying effect obtained by combining the translation and rotation of the pinions 106 employed in the drive for the chart 109.

The liquid seal is completed by a cup 112 that is supported on a steelyard rod 113 leading to the pendulum mechanism and that dips into the annular cup 100. The only modification required is that each cup be deep enough to accommodate not only its own movement but also the movement of the other cup.

Referring now to Figure IX, which shows the construction employed when a printing mechanism is to be employed, the chart 109 driving through a rack 114 and pinion 115 rotates a cross shaft 116 through an angle corresponding to the movement of the chart 109. This cross shaft 116 may conveniently be carried in ears 117 extending laterally from the lower end of a sector guide 118 that is similar to the sector guide 42 shown in Figure I. The cross shaft 116 carries a larger pinion 119 that cooperates with a rack strip 120 pivotally mounted from a unit weight printing slide carrier 121. A roller 122 engaging the upper side of the rack strip 120 keeps the rack in mesh with the larger pinion 119. The slide carrier 121 is slidably supported on a horizontal rod 123 that extends laterally from a frame 124 attached to the sector guide 118. A plurality of detent notches 125 and a detent mechanism enclosed within a housing 126 of the carrier serve to accurately position the carrier 121 at each of its positions corresponding to a definite weight added to the lever system.

A slide 127 driven by the carrier 121 carries printing indicia which are brought into printing position by movement of the carrier. A circular disk chart 128 that is driven by pendulum mechanism also carries printing indicia that are brought into printing position within the area outlined by the dotted lines 129 so that printing mechanism, not shown, may record simultaneously the weight offset by the pendulum mechanism as well as the weight offset by the weights added to the lever system. The printing mechanism is preferably of a type that employs relatively movable jaws or platens that serve to pinch the rotatable chart 128 and the slide 127 against an inked ribbon and recording paper. This type of printing mechanism is well known and is not a part of the present invention which is directed to improved scale mechanism including that for positioning the weight indicating chart 109 and slide 127.

The improved auxiliary indicating mechanism may be employed in still another manner as illustrated in Figure X. As shown herein a magnified indication of load is provided by a magnifying glass 130 that presents a magnified view of a portion of the rim of a rotatable chart 131 carrying weight indicia along its periphery. The chart 131 is carried on an indicator shaft 132 which, through a pinion, rack and drive frame assembly 133, is driven by a pair of pendulums 134 through an angle that is proportional to the load counterbalanced by the pendulums. In the scale additional load may be counterbalanced by weights added to the lever system by movement of a control handle 135. In this arrangement a drive from the mechanism controlled by the handle 135 is taken through a connecting member 136 to an annular cup 137 constituting part of a liquid seal for a housing 138 enclosing the pendulum weighing mechanism. The annular cup 137, similar to the cup 100 shown in Figures VIII and IX, drives a unit weight chart plate 139 which in this embodiment merely serves as a carriage for an arm 140 that extends laterally to a position vertically beneath the field of view of the magnifying lens 130. An indicating strip 141 pivotally attached to the arm 140 extends through the field of view and carries indicia representative of the load counterbalanced by the weights added by the movement of the handle 135.

The improved sealing mechanism employing the vertically movable annular cup allows the indicating mechanism of the scale to be rotated to any desired reading position while still permitting the housing to be effectively sealed against the entrance of dirt and without interfering with the performance of auxiliary functions within the housing, such as the indication of loads counterbalanced by added weights as in the last examples or in the operation of locking mechanism as illustrated in the first example. The accuracy of movement provided by the rugged rack and pinion drive as well as the multiplcation obtained by moving the axle of the pinions 106 permits the display of a large number of relatively large indicia without requiring extensive equipment to insure the accurate registry of the indicia in the viewing openings.

Various modifications may be made in the structural details of the weighing scales illustrated in the drawings without departing from the spirit and scope of the invention.

I claim:

1. In a weighing scale, in combination, a frame, a collar rotatably mounted on the frame, a load counterbalancing and indicating mechanism erected from the collar, a steelyard rod extending through the collar for transmitting force to the counterbalancing mechanism, a downwardly opening cup mounted on the steelyard rod, an annular cup slidably mounted in the collar and cooperating with the cup on the steelyard rod to form a liquid seal, manually operated mechanism mounted in the frame and connected to the annular cup for sliding the cup in the collar, and auxiliary load indicating mechanism mounted with the load counterbalancing and indicating mechanism and operatively driven by the annular cup.

2. In a weighing scale, in combination, a frame, a collar rotatably mounted on the frame, a load counterbalancing and indicating mechanism erected from the collar, a housing erected from the collar and enclosing the counterbalancing and indicating mechanism, a steelyard rod extending through the collar for transmitting force to the counterbalancing mechanism, a downwardly opening cup mounted on the steelyard rod, an annular cup slidably mounted in the collar, and cooperating with the cup on the steelyard rod to form a seal, mechanism in the frame operatively connected to the cup for sliding the cup in the collar, and auxiliary load indicating mechanism mounted within the housing and operatively connected to the annular cup.

3. In a weighing scale, in combination, a lower frame, a collar rotatably mounted on the lower frame, a housing mounted on the collar, an upper frame within the housing, load counterbalancing and indicating mechanism mounted on said upper frame, a member slidably mounted in the collar, a rack included in the upper frame adjacent the slidable member, a display member mounted for movement parallel to the rack, a rack formed in the display member, a pinion engaging both the racks, and means on the slidable member for supporting the pinion.

4. In a weighing scale, in combination, a lower frame, a collar rotatably mounted in the lower frame, a housing mounted on the collar, an upper frame within the housing, load counterbalancing and indicating mechanism mounted on said upper frame, a member slidably mounted in the collar, a pair of spaced apart racks included in the upper frame, a display member mounted for movement parallel to the spaced apart racks, racks included in the display member, and a pair of pinions journaled on the slidable member and each engaging a rack of the frame and a rack of the display member.

5. In a weighing scale, in combination, a lower frame, a collar rotatably mounted on the lower frame, a housing mounted on the collar, an upper frame mounted on the collar, load counterbalancing and indicating mechanism mounted on the upper frame and within the housing, a sleeve slidably mounted in the collar, a pair of spaced apart racks included in the upper frame, a member slidably mounted for movement parallel to the spaced apart racks, racks included in the member, pinions journaled on the sleeve and each engaging a rack of the member and a rack of the frame, a strip slidably mounted in the upper frame and carrying printing indicia, and means for operatively connecting the member and the strip.

6. In a weighing scale, in combination, a lower frame, a collar rotatably mounted on the lower frame, a housing mounted on the collar, an upper frame supported from the column and within the housing, load counterbalancing and indicating mechanism mounted on said upper frame, a sleeve slidably mounted in the collar, locking mechanism for the counterbalancing mechanism, said locking mechanism being operatively connected to the slidable sleeve, and mechanism in the lower frame for operating the sleeve and with it the locking mechanism.

7. In a weighing scale, in combination, a lower frame, a collar rotatably mounted on the lower frame, a housing mounted on the collar, an upper frame supported from the column and within the housing, load counterbalancing and indicating mechanism mounted on said upper frame, an annular cup slidably mounted in the collar, a steelyard rod extending through the annular cup for transmitting force to the counterbalancing mechanism, a cup mounted on the steelyard rod and cooperating with the annular cup to form a seal, locking mechanism for the counterbalancing mechanism, said locking mechanism being connected to the annular cup, and means in the lower frame for sliding the annular cup to effect locking of the counterbalancing mechanism.

LAWRENCE S. WILLIAMS.

REFERENCES CITED

The following references are of record in the file of this patent:

UNITED STATES PATENTS

| Number | Name | Date |
| --- | --- | --- |
| 1,606,938 | Hem | Nov. 16, 1926 |
| 1,626,963 | Osgood | May 3, 1927 |
| 1,742,585 | De Brouckere | Jan. 7, 1930 |
| 1,878,205 | Ulrich | Sept. 20, 1932 |